United States Patent [19]

Gielda et al.

[11] Patent Number: 5,526,872
[45] Date of Patent: Jun. 18, 1996

[54] AIRFLOW EJECTOR FOR AN AUTOMOTIVE VEHICLE

[75] Inventors: Thomas P. Gielda, Brighton; Christopher M. Greiner, Birmingham; Donald A. Willoughby, Northville, all of Mich.

[73] Assignee: Ford Motor Company, Dearborn, Mich.

[21] Appl. No.: 139,681

[22] Filed: Oct. 22, 1993

[51] Int. Cl.[6] .......................... B60K 11/00; B60K 11/02; B62D 35/02
[52] U.S. Cl. ........................... 165/41; 165/51; 165/121; 165/122; 180/68.1; 123/41.49; 296/180.1
[58] Field of Search ................... 165/41, 44, 51, 165/121, 122; 180/68.1; 123/41.49; 296/180.1

[56] References Cited

U.S. PATENT DOCUMENTS

| | | | |
|---|---|---|---|
| 703,436 | 7/1902 | Maybach | 123/41.49 |
| 2,913,065 | 11/1959 | Lyon, Jr. | 180/68.1 |
| 3,205,964 | 9/1965 | Biabaud | 165/44 |
| 3,937,192 | 2/1976 | Longhouse | 165/51 |
| 4,114,714 | 9/1978 | Fachbach et al. | |
| 4,173,995 | 11/1979 | Beck | |
| 4,181,172 | 1/1980 | Longhouse | 165/121 |
| 4,706,615 | 11/1987 | Scadding | |
| 4,995,447 | 2/1991 | Weidmann et al. | |
| 5,046,554 | 9/1991 | Iwasaki et al. | 165/44 |
| 5,143,516 | 9/1992 | Christensen | |
| 5,180,003 | 1/1993 | Kouzel et al. | |
| 5,269,264 | 12/1993 | Weinhold | 123/41.05 |
| 5,322,340 | 6/1994 | Sato et al. | 180/68.1 |

FOREIGN PATENT DOCUMENTS

| | | | |
|---|---|---|---|
| 0060657 | 3/1943 | Denmark | 180/68.1 |
| 0191012 | 8/1986 | European Pat. Off. | 165/41 |
| 0192934 | 9/1986 | European Pat. Off. | 296/180.1 |
| 2442154 | 11/1979 | France . | |
| 0064139 | 3/1914 | Germany | 180/68.1 |
| 2722089 | 11/1978 | Germany | 180/68.4 |
| 2912386 | 10/1980 | Germany | 180/68.1 |
| 3412607 | 10/1985 | Germany | 123/41.49 |
| 2189199 | 10/1987 | Germany | 296/180.1 |
| 3735921 | 1/1988 | Germany . | |
| 3630645 | 3/1988 | Germany | 296/180.1 |
| 3704145 | 8/1988 | Germany | 296/180.1 |
| 4243593A1 | 7/1993 | Germany . | |
| 0550820 | 2/1958 | Italy | 180/68.1 |
| 5-131849 | 5/1993 | Japan | 180/68.1 |
| 2051691 | 1/1981 | United Kingdom | 296/180.1 |

Primary Examiner—John K. Ford
Attorney, Agent, or Firm—Raymond L. Coppiellie; Roger L. May

[57] ABSTRACT

A cooling system for an automotive vehicle is disclosed including a heat exchanger assembly, a rotatable axial flow fan and a shroud member at least partially surrounding the fan and the heat exchanger assembly. The cooling system further includes an ejector disposed between the heat exchanger and the engine for drawing ambient air from under the heat exchanger and pumping the air toward the engine and for preventing recirculation of the air exiting the shroud member back to the fan while the vehicle is at idle.

10 Claims, 3 Drawing Sheets

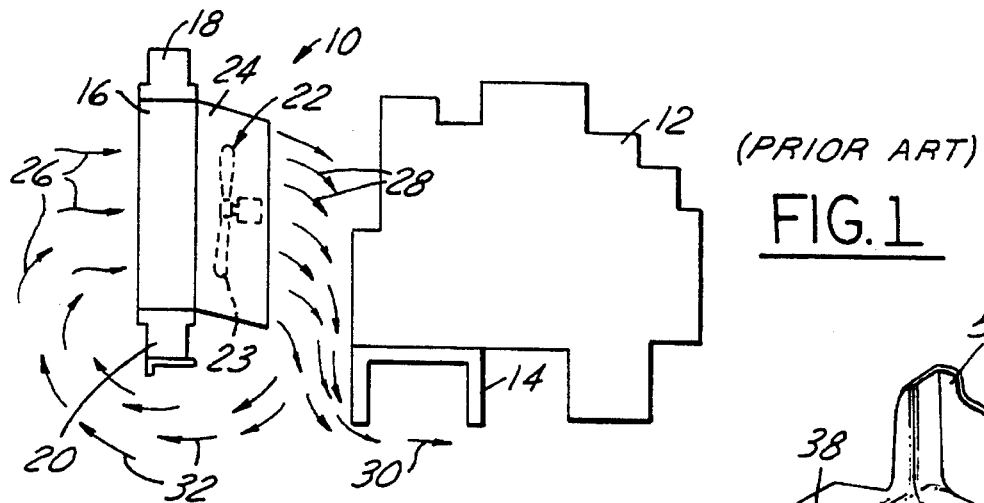
(PRIOR ART)
FIG. 1
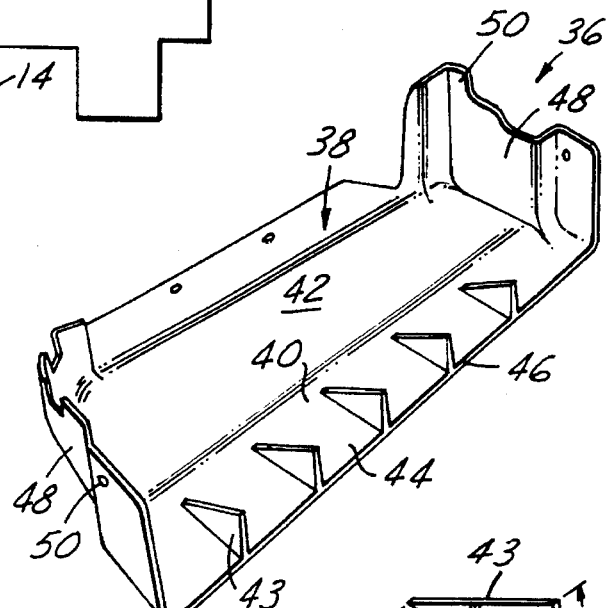
FIG. 3
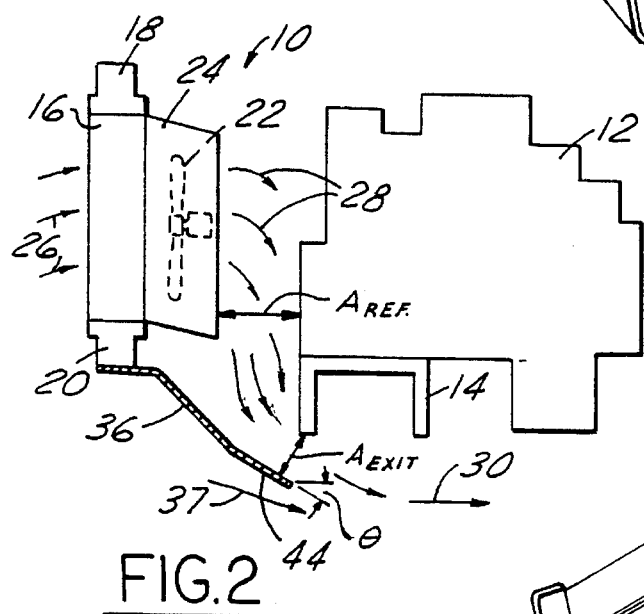
FIG. 2
FIG. 3A
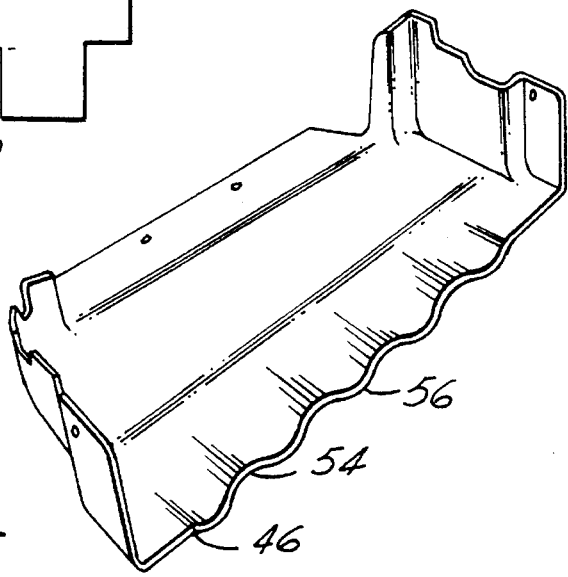
FIG. 4

5,526,872

AIRFLOW EJECTOR FOR AN AUTOMOTIVE VEHICLE

BACKGROUND OF THE INVENTION

1. Field of the Invention

The present invention relates generally to a cooling system for cooling an engine of an automotive vehicle. More particularly, the present invention relates to an ejector used in an automotive cooling system which substantially reduces recirculation of air into the fan of the cooling system.

2. Disclosure Information

Most vehicles used today are propelled by internal combustion engines and such engines, as is well known, generate heat during their operation. For the most part, the internal combustion engines employed commercially are of the liquid-cooled type which employs the circulation of a coolant through the engine for absorbing heat. The correct operating temperature of the engine is maintained by subsequently passing, under pressure, the heated coolant received from the engine through a heat exchanger system and returning the coolant to the engine for recirculation therein. Generally, the heat exchange system employed includes a heat exchanger or a radiator and condenser assembly through which the heated coolant received from the engine flows. Simultaneously, the fan disposed between the radiator and the engine draws ambient air through the radiator which absorbs the heat from the heated coolant and carries it to the atmosphere. In most vehicle applications, the air stream formed by the fan is discharged back over the engine after passing through the radiator. This engine fan exhaust impinges on the engine block of the vehicle engine and is turned approximately 90° downward. This hot exhaust air then impacts the ground and a portion of the fan exhaust is redirected toward the front of the vehicle where the hot air flow is subsequently reingested into the front-end air stream. This recirculation results in increased engine coolant air inlet temperatures and subsequently increased air conditioning head pressure. This is particularly a problem when the vehicle is at idle in hot regions.

Various devices have been proposed to reduce or eliminate the hot air recirculating back to the front end intake of the vehicle. For example, U.S. Pat. No. 4,173,995 discloses a recirculation barrier for a heat transfer system for an automotive vehicle. The patent teaches eliminating air flow recirculation in the fan shroud-hub region of the vehicle by contouring the fan shroud and installing a deflection plate which turns the flow of air from an axial to a radial direction, thereby reducing the amount of air flow recirculating in the fan shroud region. By reducing the amount of recirculation in the fan shroud, the fan operates more efficiently and more cooling air is pulled through the fan/radiator. This system does not disclose the use of an ejector for reducing the amount of recirculation of the hot air into the fan intake.

Ejectors have been utilized in the aerospace industry to increase engine thrust by increasing primary and bypass air stream mixing. Heretofore, however, an ejector has never been utilized in the automotive environment for reducing air flow recirculation, particularly when an automotive vehicle is at idle conditions. It is, therefore, an object of the present invention to reduce the air conditioning head pressure during idle condition by decreasing engine air flow recirculation without effecting engine cooling performance.

SUMMARY OF THE INVENTION

The present invention provides a cooling system for cooling an engine of an automotive vehicle comprising a heat exchanger assembly disposed in an engine compartment of the vehicle and secured therein by support members, a rotatable axial flow fan having a plurality of circumferentially spaced impeller blades extending radially from a hub and disposed adjacent said heat exchanger. The cooling system further includes a shroud member at least partially surrounding the fan in the heat exchanger assembly, the shroud member directing the flow of air through the heat exchanger assembly and into the engine compartment. The shroud member is disposed a predetermined distance from the engine to define a reference area of predetermined size therebetween. The cooling system also includes ejector means disposed between the heat exchanger assembly and the engine for drawing ambient air from under the heat exchanger assembly and pumping the air toward the engine as well as for preventing recirculation of the air exiting the shroud member back to the fan while the vehicle is stationary.

There is also disclosed herein an ejector for reducing recirculation of air directed by a fan through a heat exchanger assembly toward an automotive vehicle engine comprising a web having a longitudinal and horizontal axes and including a first portion inclined at a predetermined angle relative to the plane of the surface upon which the vehicle is traveling. The web further includes a second portion connected to the vehicle adjacent the heat exchanger assembly, the web being disposed between heat exchanger assembly and the engine. In one embodiment, the first portion includes a plurality of generally vertical tabs and the predetermined angle of the first portion of the web relative to the plane of the surface upon which the vehicle is traveling is less than 35°.

It is an advantage of the present invention to provide a simple, passive device to redirect the flow of underhood air to the aft end of the vehicle by drawing cooler free stream air from the front of the vehicle into the underbody region, especially while the vehicle is at idle. In doing so, the ejector of the present invention reduces the power requirements of the vehicle by decreasing the amount of time the vehicle is operating in a high speed fan mode. These and other objects, features and advantages of the present invention will become apparent from the drawings, detailed description and claims which follow.

BRIEF DESCRIPTION OF THE DRAWINGS

FIG. 1 is a schematic drawing indicating air flow paths of an automotive vehicle engine compartment of the prior art while the vehicle is at idle condition.

FIG. 2 is a schematic drawing indicating the air flow path of an automotive engine compartment having an ejector structured in accord with the principles of the present invention.

FIG. 3 is a perspective view of an ejector structured in accord with the principles of the present invention.

FIG. 3A is an enlarged view of the circled portion of FIG. 3.

FIG. 4 is a perspective view of the exit end of one embodiment of an ejector according to the present invention.

DETAILED DESCRIPTION OF THE PREFERRED EMBODIMENTS

Figure 5A:
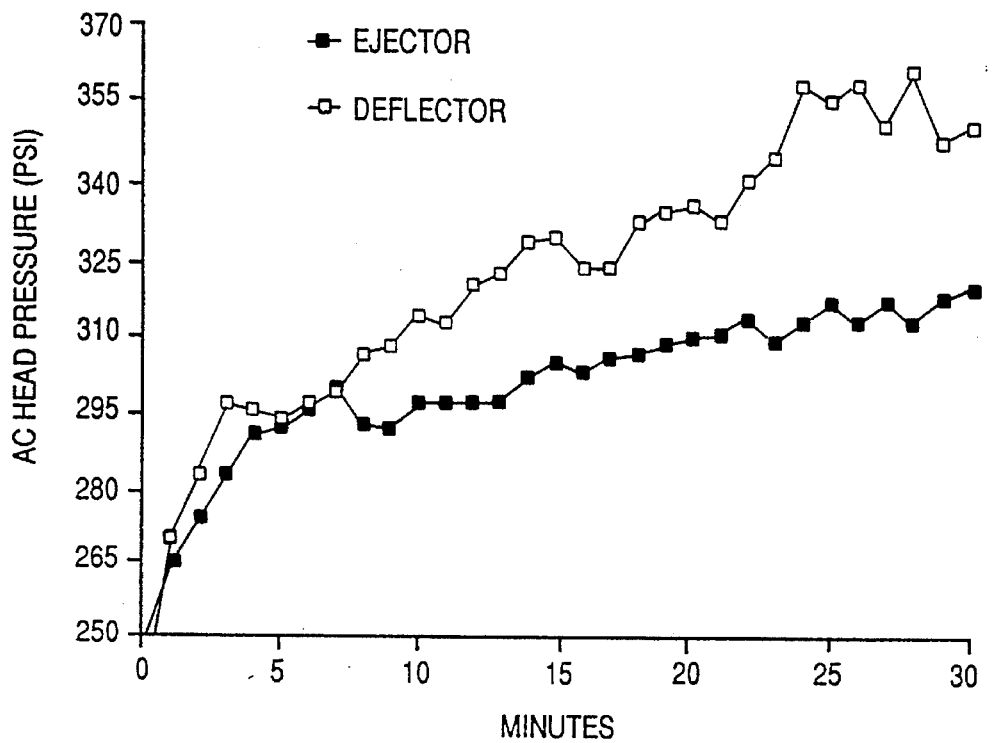
FIG. 5A is a plot diagram of air conditioning head pressure versus time comparing a prior art deflector with an ejector of the present invention.

Referring now to the drawings wherein like reference numerals represent like elements throughout the various views, FIG. 1 shows a typical prior art engine compartment of an automotive vehicle. The engine compartment 10 houses an automotive engine 12 supported therein by engine supports 14 mounted to a portion of the vehicle frame. The vehicle further includes a heat exchanger assembly, such as a radiator 16 mounted by upper support members 18 and lower support members 20 to the interior of the engine compartment 10. A rotatable, axial flow fan 22 is disposed adjacent the radiator 16. As is well known in the art, the fan 22 includes a plurality of circumferentially spaced impeller blades 23 extending radially from a hub. As is well known in the art, water or engine coolant flows between the radiator 16 and the engine 12 through a pair of fluid conduits such as hoses (not shown). The fan 22, typically driven by a conventional belt and pulley combination, pulls ambient air through the radiator 16 to provide for cooling the fluid passing between the radiator and the engine. A fan shroud member 24 surrounds the fan 22 and directs the flow of air through the radiator 16 toward the engine 12.

FIG. 1 shows the air flow through the engine compartment of a prior art cooling system. As shown therein, ambient air 26 is pulled through radiator 16 by fan 22 and directed toward engine 12 by fan shroud member 24. Upon exiting the fan shroud, the air stream 28 impinges the engine 12 and is directed 90° downward where it contacts the surface upon which the vehicle is sitting. At this point, a portion of the air stream is directed toward the aft end of the vehicle (as indicated by numeral 30). However, a portion of this air stream is directed toward the front end of the vehicle (as indicated at 32) and is eventually recirculated into the ambient air 26 entering the vehicle radiator 16. Drawing in air at this elevated temperature raises the heat exchanger inlet temperature, resulting in an increase in the head pressure in the compressor of the air conditioning system. If the head pressure of the compressor builds up past a predetermined threshold, the compressor will fail, particularly while the vehicle is at idle. As described above, this is particularly a problem in the hot regions of the country.

FIG. 2 shows a schematic, side view of an engine compartment similar to FIG. 1 but including an ejector 36 according to the present invention. As shown therein, the ambient incoming air 26 passes through radiator 16 and fan shroud member 24 and exits the fan shroud at 28. The exiting air 28 impinges the vehicle engine 12 as before and is directed 90° downward. However, because of the placement and operation of ejector 36, the exiting air 28 is directed substantially all to the rear of the vehicle as shown at 30. This is because the ejector 36 draws ambient air from under the radiator assembly 16 and pumps this ambient air 37 toward the engine 12 of the vehicle. By pumping this air 37 away from under the radiator assembly 16, the ejector 36 prevents recirculation of the air 28 exiting the shroud member 24 back to the fan while the vehicle is stationary. None of the other typical prior art recirculation shields discussed above causes the ambient air 37 to flow from under the radiator assembly 16 and pumps this air toward the rear end of the vehicle while the vehicle is stationary. As such, the recirculation of air is greatly reduced, thereby reducing the inlet temperature of the heat exchange assembly and reducing the air conditioning head pressure as will be shown in greater detail below.

FIG. 3 shows a perspective view of the ejector 36 of the present invention. The ejector 36 comprises a web 38 of material, the web including a first portion 40 and a second portion 42. As shown more clearly in FIG. 2, the first portion 40 of the web is inclined at a predetermined angle ($\theta$) relative to the plane of the surface upon which the vehicle is disposed. Typically, Theta ($\theta$) is less than 35°, and in the preferred embodiment ranges between 10°–25°. It is this angle Theta ($\theta$) which is a critical feature of the present invention since if Theta ($\theta$) is too large, then the air exiting the fan shroud 28 can recirculate back to the radiator 16 and thus increase the inlet temperature thereat. This will be shown and described later.

In the preferred embodiment, the first portion 40 includes a plurality of tab members 43 spaced equidistantly along the trailing edge 46. The number of tab members 43 will vary depending on the application used and airflow characteristics to be achieved. Each of the tab members 43 is generally triangularly shaped, although each tab member may have any other suitable shape. The tab members 43 increase the strength of the underbody entrainment flowfield (37 in FIG. 2) as well as reduce the aerodynamic drag of the ejector 36. As can be seen in FIG. 3A, each of the tab members 43 has an optimized height/length ratio (y/x), that being 0.5 in the preferred embodiment. However, that ratio can range from between 0.45 to 0.60. This enhances the underbody airstream mixing and engine cooling.

The exit end 44 of the first portion 40 of web 38 defines a trailing edge 46 thereat. The thickness of the trailing edge 46 should be minimized to promote mixing in turbulence of the exit air passing therepast. FIG. 4 shows an alternative embodiment wherein the trailing edge has a corrugated cross-section having a plurality of crests 54 and valleys 56. These crests and valleys create further air turbulence and mixing of air to create a greater entrained flow of ambient air 37 from under the radiator assembly 16. The trailing edge of the ejector must extend below the lowest structural member in a near downstream region, such as at the engine support 14. If the trailing edge is located above the support, the effect of ejector exiting will be increased resulting in increased air flow recirculation.

The second portion 42 of the web 38 of ejector 36 includes a pair of generally vertical walls 48 disposed at the longitudinal edges thereof. The walls include a plurality of apertures 50 which receive a fastener therethrough to connect the ejector to the lower radiator support member 20. Alternatively, the ejector 36 could be fastened to any frame member or engine compartment member of the vehicle.

Referring back to FIG. 2, another critical dimension of the present invention is the ratio of the exit area of the ejector to the area between the fan shroud 24 and the vehicle engine 12. The fan shroud 24 is disposed a predetermined distance from the engine 12 and this distance can be computed into an area denoted by $A_{ref}$ in FIG. 2. The exit end 44 of the ejector 36 is located a predetermined distance from the vehicle engine 12 or the engine support 14 as denoted by $A_{exit}$ in FIG. 2. The ratio of this exit area to the reference area, $A_{exit}/A_{ref}$ is critical in determining the design and location of the ejector 36 to optimize the reduction in air flow recirculation. For example, it has been determined that the ratio of the exit area to the reference area should be greater than 0.5 to achieve optimum benefits of the ejector 36 as will be shown later with reference to FIG. 7 below.

Figure 5B:
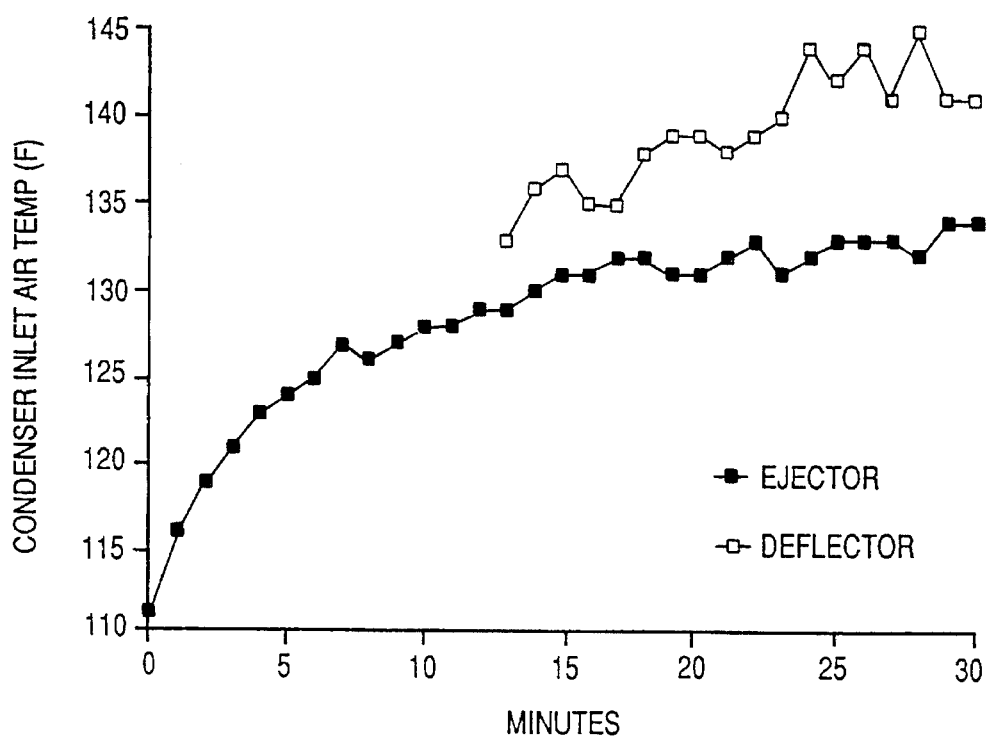
FIG. 5B is a plot diagram of inlet temperature versus time comparing a prior art deflector with an ejector according to the present invention.

FIGS. 5A and 5B show a comparison of the ejector of the present invention to a typical prior art air deflector on the air conditioning head pressure and inlet heat exchanger inlet temperatures versus time for a given vehicle. FIG. 5A shows that the air conditioning head pressure is substantially decreased using an ejector of the present invention after the vehicle has been idling for 30 minutes. A difference of approximately 40 psi exists after a 30 minute idle condition which is a substantial reduction in the air conditioning head pressure. FIG. 5B shows that the inlet temperature of the heat exchanger member (a condenser as tested) shows a decrease in temperature of approximately 10° (F.) after a 30 minute test while the vehicle idles (note that the deflector data begins at t=13 minutes; no data prior to 13 minutes was available). This substantial reduction in inlet air temperature has the direct result on the AC head pressure as shown in FIG. 5A and leads to an increase in the life expectancy of the air conditioning components within the system.

Figure 6:
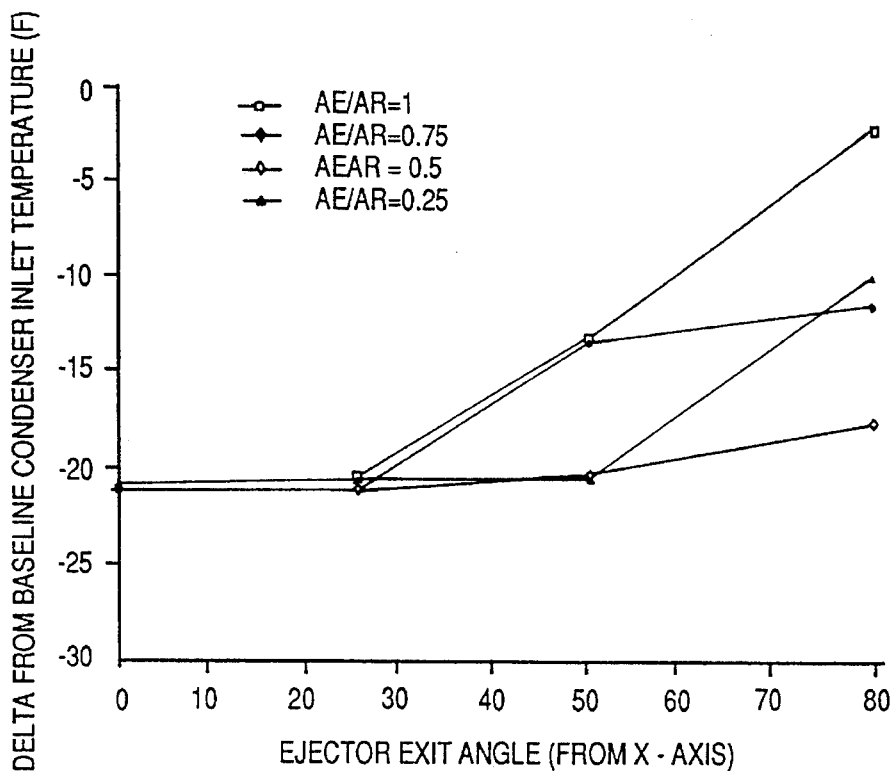
FIG. 6 is a plot diagram showing the effect of ejector exit angle on inlet temperature for a vehicle.

FIG. 6 shows a plot of the inlet temperature versus the ejector angle (Theta) formed by the exit end 44 of the ejector 36 relative to the plane upon which the vehicle is resting for a variety of ratios of exit area to reference area. As can be seen in FIG. 6, the values remain substantially constant until an exit angle of about 35°. At that point, the temperatures rise rapidly indicating that recirculation of the air gradually increases back to the heat exchanger of the vehicle. Therefore, it would be advantageous to provide an ejector exit angle of less than 35° to minimize the increase in inlet temperature to the heat exchanger of the cooling system.

Figure 7:
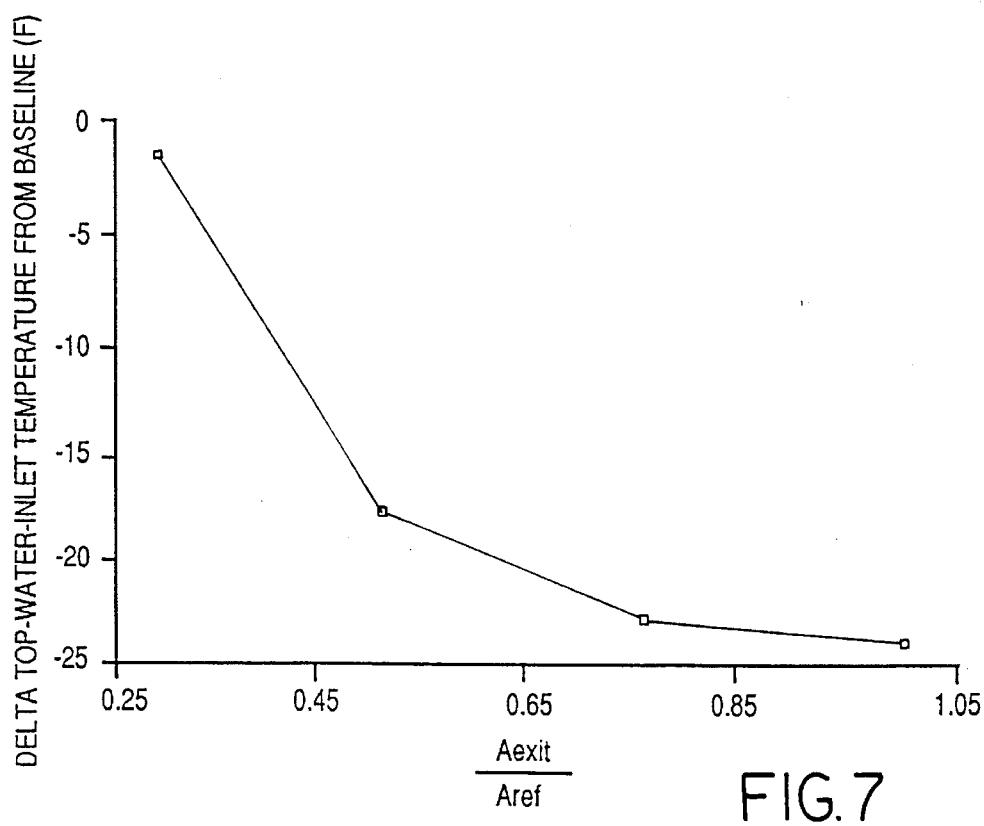
FIG. 7 is a plot diagram showing the effect of ejector exit area ratio on inlet temperature for an automotive vehicle.

As explained above, the ratio of the exit area, Aexit to the reference area, $A_{ref}$, is important as well to the operation of the present invention. FIG. 7 plots the change in water inlet temperature versus the exit area ratio ($A_{exit}/A_{ref}$) for a specific vehicle application. As shown therein, the water inlet temperature substantially decreases at a ratio of approximately 0.50 and continues until it levels out at approximately a ratio of 1.0. Therefore, to optimize the reduction of air flow recirculation and decrease the change in inlet temperature, it is preferred to have an exit area ratio of greater than 0.5. Furthermore, packaging issues rarely allow the exit area ratio to be greater than 1.0. If the exit area ratio is too small, the ejector system will increase the static pressure in the engine compartment resulting in increased leakage and recirculation of the air stream. Hot engine air will blow forward into the condenser in-flow air stream via side spillage around the condenser or radiator supports.

By utilizing a passive ejector according to the present invention, the amount of recirculation of air to the vehicle is greatly decreased. The ejector decreases the fan power requirements of the vehicle by decreasing the underhood and underbody temperature of the vehicle, especially during idle and cruise conditions. This type of ejector further decreases the vehicle sensitivity to tail-winds while the vehicle is idling and, therefore, represents a great benefit to the operation of the vehicle.

Various other modifications and alterations of the present invention should be apparent to those skilled in the art. For example, the ejector can be fabricated from a synthetic polymeric material such as an ABS, a nylon or any other material achieving the same beneficial characteristics. The shape of the ejector can take many forms depending upon the available package space and design of the vehicle and the present invention is not meant to be limited to a single shape. Therefore, it is the following claims, including all equivalents which define the scope of the invention.

What is claimed is:

1. A cooling system for cooling an engine of an automotive vehicle, comprising:

a heat exchanger assembly disposed in an engine compartment of the vehicle and secured therein by support members;

a rotatable axial flow fan having a plurality of circumferentially spaced impeller blades extending radially from a hub and disposed adjacent said heat exchanger;

a shroud member at least partially surrounding said fan and said heat exchanger assembly, said shroud member being operative to direct the flow of air from said fan through said heat exchanger assembly and into said engine compartment said shroud member being disposed a predetermined distance from said engine to define a reference area of predetermined size therebetween; and ejector means disposed between said heat exchanger assembly and said engine for drawing ambient air from under said heat exchanger assembly and pumping said ambient air under said engine to create an underbody entrainment flowfield thereby and for preventing recirculation of air exiting said shroud member back to said fan while said vehicle is stationary, said ejector means comprising a web having a longitudinal and horizontal axes and including a portion inclined at a predetermined angle of less than 35 degrees relative to the plane of the surface upon which said vehicle is disposed, said web further including a second portion connected to said vehicle adjacent said heat exchanger assembly, said ejector means further including an exit end proximate said vehicle engine and defining an exit area of predetermined magnitude between said exit end and said engine such that the ratio of said exit area to said reference area is greater than 0.50.

2. A cooling system according to claim 1, wherein said second portion of said web includes a pair of generally vertical walls disposed at the longitudinal edges of said web, said wall being operative to secure said ejector means to said heat exchanger assembly.

3. A cooling system according to claim 1, wherein the first portion of said web includes a trailing edge proximate said vehicle engine, said trailing edge having a predetermined thickness.

4. A cooling system according to claim 1, wherein the first portion of said web includes a trailing edge proximate said vehicle engine, said trailing edge having an undulating cross-section along a generally horizontal axis thereof.

5. A cooling system according to claim 1, wherein said web is fabricated from a synthetic polymeric material.

6. A cooling system according to claim 1, wherein said ejector means further includes a plurality of tab members disposed thereon, said tab members being operative to increase the strength of said underbody entrainment flowfield.

7. A cooling system for cooling an engine of an automotive vehicle, comprising:

a radiator disposed in an engine compartment of the vehicle and secured therein by support members;

a rotatable axial flow fan having a plurality of circumferentially spaced impeller blades extending radially from a hub and disposed on one side of said heat exchanger;

a shroud member at least partially surrounding said fan and said radiator, said shroud member being operative to direct the flow of air through said radiator and into said engine compartment, said shroud member being disposed a predetermined distance from said engine to define a reference area of predetermined size therebetween; and an ejector disposed between said radiator and said engine, said ejector being operative to draw ambient air from under said radiator and pump said ambient air under said engine to create an underbody entrainment flowfield thereby and to prevent recirculation of air exiting said shroud member back to said fan while said vehicle is stationary, said ejector comprising a web having a longitudinal and transverse axes and including a first portion inclined at a predetermined angle of less than 35 degrees relative to the plane of the surface upon which said vehicle is disposed and a second portion connected to said vehicle adjacent said heat exchanger assembly, said ejector further including an exit end proximate said vehicle engine and defining an exit area of predetermined magnitude between said exit end and said engine such that the ratio of said exit area to said reference area is greater than 0.50.

8. A cooling system according to claim 7, wherein said second portion of said web includes a pair of generally vertical walls disposed at the longitudinal edges of said web, said wall being operative to secure said ejector to said radiator.

9. A cooling system according to claim 7, wherein said ejector further includes a plurality of generally vertical tab members disposed on the first portion, said tab members having a height to length ratio of between 0.45–0.60 and being operative to increase the strength of said underbody entrainment flowfield.

10. An ejector for reducing recirculation of air directed by a fan through a heat exchanger assembly toward an automotive vehicle engine, comprising:

a web having a longitudinal and horizontal axes and including a first portion inclined at a predetermined angle of less than 35 degrees relative to the plane of the surface upon which said vehicle is disposed and a second portion connected to said vehicle adjacent said heat exchanger assembly, said first portion being operative to create an underbody entrainment flowfield of ambient air from under said heat exchanger assembly and including a plurality of generally vertical tab members disposed thereon, each tab member having a height to length ratio of 0.5, said web being disposed between said heat exchanger assembly and said engine and wherein said first portion of said web includes an exit end proximate said vehicle engine, said web defining an exit area of predetermined magnitude between said exit end and said engine, such that the ratio of said exit area to an area defined between said vehicle engine and said heat exchanger assembly is greater than 0.50.

* * * * *